(12) United States Patent
Nagano et al.

(10) Patent No.: US 11,586,189 B2
(45) Date of Patent: Feb. 21, 2023

(54) PLANT MONITORING DEVICE, PLANT MONITORING METHOD, AND PROGRAM

(71) Applicant: Mitsubishi Power, Ltd., Kanagawa (JP)

(72) Inventors: Ichiro Nagano, Yokohama (JP); Mayumi Saito, Tokyo (JP); Keiji Eguchi, Tokyo (JP); Kuniaki Aoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 69 days.

(21) Appl. No.: 17/430,445

(22) PCT Filed: Mar. 13, 2020

(86) PCT No.: PCT/JP2020/011224
§ 371 (c)(1),
(2) Date: Aug. 12, 2021

(87) PCT Pub. No.: WO2020/195978
PCT Pub. Date: Oct. 1, 2020

(65) Prior Publication Data
US 2022/0121192 A1    Apr. 21, 2022

(30) Foreign Application Priority Data
Mar. 28, 2019 (JP) .............................. JP2019-063575

(51) Int. Cl.
*G05B 23/02* (2006.01)
(52) U.S. Cl.
CPC ....... *G05B 23/0235* (2013.01); *G05B 23/024* (2013.01); *G05B 23/0221* (2013.01)
(58) Field of Classification Search
CPC ............ G05B 23/0235; G05B 23/0221; G05B 23/024; G05B 23/02; G21C 17/00
See application file for complete search history.

(56) References Cited

U.S. PATENT DOCUMENTS

| 2010/0198555 A1 | 8/2010 | Takahama et al. |
| 2019/0264573 A1 | 8/2019 | Nagano et al. |

FOREIGN PATENT DOCUMENTS

| JP | 08-313685 | 11/1996 |
| JP | 2012-067757 | 4/2012 |
| JP | 2017-215864 | 12/2017 |

OTHER PUBLICATIONS

Linlin Shi et al., Evaluation of health condition for IMA module based on Mahalanobis distance, 2018, IEEE 2018 Prognostics and System Health Management Conference, pp. 303-307 (Year: 2018).*

(Continued)

*Primary Examiner* — Mischita L Henson
(74) *Attorney, Agent, or Firm* — Wenderoth, Lind & Ponack, L.L.P.

(57) ABSTRACT

A plant monitoring device (20) is provided with: a detection value acquisition unit (211) that acquires a bundle of detection values; a first Mahalanobis distance calculation unit (212) that calculates a first Mahalanobis distance; a plant state determination unit (213) that determines whether the operation state of a plant is normal or abnormal; a cause detection value estimation unit (214) that estimates a cause detection value which represents a cause of the abnormality of the plant; a second Mahalanobis distance calculation unit (215) that calculates a second Mahalanobis distance by increasing or decreasing the detection value estimated as the cause detection value; and an identification unit (216) that identifies whether the abnormality can be relieved by increasing or decreasing the detection value estimated as the cause detection value.

9 Claims, 5 Drawing Sheets

(56) References Cited

OTHER PUBLICATIONS

International Search Report dated Jun. 16, 2020 in corresponding International Application No. PCT/JP2020/011224, with English translation.
Written Opinion of the International Searching Authority dated Jun. 16, 2020 in corresponding International Application No. PCT/JP2020/011224, with English translation.

* cited by examiner

| <ABNORMALITY INFORMATION> | | |
|---|---|---|
| EVALUATION ITEM (DETECTOR NAME) | LEVEL OF CAUSE DETECTION VALUE | S/N RATIO (db) |
| WATER LEVEL OF DRUM OF HEAT RECOVERY STEAM GENERATOR | + | 5 |

| ESTIMATED CAUSE OF ABNORMALITY | POSSIBILITY OF FAILURE (db) |
|---|---|
| SHARP DROP OF GAS TURBINE LOAD | 20 |
| ABNORMAL OPENING OF REGULATING VALVE | 17 |
| ⋮ | ⋮ |

FIG. 6

PLANT MONITORING DEVICE, PLANT MONITORING METHOD, AND PROGRAM

TECHNICAL FIELD

The present invention relates to a plant monitoring device, a plant monitoring method, and a program. Priority is claimed on Japanese Patent Application No. 2019-063575 filed on Mar. 28, 2019, the content of which is incorporated herein by reference.

BACKGROUND ART

In various types of plants, such as a gas turbine power generation plant, an atomic power generation plant, and a chemical plant, a bundle of detection values (state quantities) of each of a plurality of evaluation items (temperature and pressure) is acquired, and whether or not the plant is operating normally is monitored based on the tendencies of the detection values. For example, PTL 1 describes a technique of calculating a Mahalanobis distance of a bundle of detection values acquired at an evaluation time point with a unit space configured by a plurality of bundles of detection values as reference and determining whether or not an operation state of a plant is normal according to whether or not the Mahalanobis distance is within a threshold value determined in advance. In addition, PTL 1 describes a technique of estimating an item of a detection value being a cause of an abnormality among the bundle of detection values based on a difference in a desired S/N ratio.

CITATION LIST

Patent Literature

[PTL 1] Japanese Unexamined Patent Application Publication No. 2012-67757

SUMMARY OF INVENTION

Technical Problem

However, although it is possible to estimate a detection value being a cause of an abnormality, there is no means to tell whether the abnormality of the plant can be mitigated by performing either an operation of increasing the detection value or an operation of decreasing the detection value in the technique of the related art.

The present invention is devised in view of such a problem, and provides a plant monitoring device, a plant monitoring method, and a program, in which operation for mitigating an abnormality of a plant can be appropriately determined.

Solution to Problem

In order to solve the problem, the present invention adopts means below.

According to a first aspect of the present invention, there is provided a plant monitoring device that monitors an operation state of a plant which includes a plurality of evaluation items. The plant monitoring device includes a detection value acquisition unit that acquires a bundle of detection values, which is a collection of the detection values for each of the plurality of evaluation items, from the plant, a first Mahalanobis distance calculation unit that calculates a first Mahalanobis distance of the bundle of detection values with a unit space configured by a plurality of the bundles of detection values as reference, a plant state determination unit that determines whether the operation state of the plant is normal or abnormal according to whether or not the first Mahalanobis distance is within a threshold value determined in advance, a cause detection value estimation unit that estimates a cause detection value, which is a detection value estimated to be a cause of an abnormality of the plant among the bundle of detection values, in a case where the operation state of the plant is determined to be abnormal, a second Mahalanobis distance calculation unit that makes the detection value estimated as the cause detection value among the bundle of detection values greater or smaller than the detection values acquired by the detection value acquisition unit and calculates a second Mahalanobis distance of the bundle of the detection values, and an identification unit that identifies, based on the second Mahalanobis distance, whether the abnormality of the plant is able to be mitigated by making the detection value estimated as the cause detection value greater than the detection values acquired by the detection value acquisition unit or whether the abnormality of the plant is able to be mitigated by making the detection value estimated as the cause detection value smaller than the detection values acquired by the detection value acquisition unit.

In this way, the plant monitoring device can identify whether the abnormality of the plant can be mitigated by performing, for the abnormality of the plant, either an operation of increasing the detection value estimated as the cause detection value or an operation of decreasing the detection value estimated as the cause detection value. Accordingly, the plant monitoring device can appropriately determine operation for mitigating the abnormality of the plant.

According to a second aspect of the present invention, in the plant monitoring device according to the first aspect, the second Mahalanobis distance calculation unit makes the detection value estimated as the cause detection value greater than the detection values acquired by the detection value acquisition unit by a predetermined amount and calculates the second Mahalanobis distance. The identification unit identifies that the abnormality of the plant is unable to be mitigated by making the detection value estimated as the cause detection value greater than the detection values acquired by the detection value acquisition unit by a predetermined amount in a case where the second Mahalanobis distance is greater than the first Mahalanobis distance, and identifies that the abnormality of the plant is able to be mitigated by making the detection value estimated as the cause detection value greater than the detection values acquired by the detection value acquisition unit by a predetermined amount in a case where the second Mahalanobis distance is smaller than the first Mahalanobis distance.

In this way, in a case where the Mahalanobis distance has increased by making the detection value estimated as the cause detection value greater than the acquired values, the plant monitoring device can accurately identify that operation of increasing the detection value estimated as the cause detection value is not to be performed. In a case where the Mahalanobis distance has decreased, operation of increasing the detection value estimated as the cause detection value is to be performed.

According to a third aspect of the present invention, in the plant monitoring device according to the first aspect, the second Mahalanobis distance calculation unit makes the detection value estimated as the cause detection value smaller than the detection values acquired by the detection value acquisition unit by a predetermined amount and calculates the second Mahalanobis distance. The identification unit identifies that the abnormality of the plant is unable to be mitigated by making the detection value estimated as the cause detection value smaller than the detection values acquired by the detection value acquisition unit by a predetermined amount in a case where the second Mahalanobis distance is greater than the first Mahalanobis distance, and identifies that the abnormality of the plant is able to be mitigated by making the detection value estimated as the cause detection value smaller than the detection values acquired by the detection value acquisition unit by a predetermined amount in a case where the second Mahalanobis distance is smaller than the first Mahalanobis distance.

In this way, the plant monitoring device can accurately identify whether or not it is possible to mitigate the abnormality of the plant by performing operation of increasing the detection value estimated as the cause detection value.

According to a fourth aspect of the present invention, in the plant monitoring device according to the first aspect, the second Mahalanobis distance calculation unit acquires the second Mahalanobis distance calculated by making the detection value estimated as the cause detection value greater than the detection values acquired by the detection value acquisition unit by a predetermined amount and the second Mahalanobis distance calculated by making the detection value estimated as the cause detection value smaller than the detection values acquired by the detection value acquisition unit by a predetermined amount. The identification unit identifies that the abnormality of the plant is able to be mitigated by making the detection value estimated as the cause detection value smaller than the detection values acquired by the detection value acquisition unit by a predetermined amount in a case where the second Mahalanobis distance calculated by making the detection value estimated as the cause detection value greater than the detection values acquired by the detection value acquisition unit by the predetermined amount is greater than the second Mahalanobis distance calculated by making the detection value estimated as the cause detection value smaller than the detection values acquired by the detection value acquisition unit by the predetermined amount, and identifies that the abnormality of the plant is able to be mitigated by making the detection value estimated as the cause detection value greater than the detection values acquired by the detection value acquisition unit by a predetermined amount in a case where the second Mahalanobis distance calculated by making the detection value estimated as the cause detection value greater than the detection values acquired by the detection value acquisition unit by the predetermined amount is smaller than the second Mahalanobis distance calculated by making the detection value estimated as the cause detection value smaller than the detection values acquired by the detection value acquisition unit by the predetermined amount.

In this way, the plant monitoring device can accurately identify that either an operation of increasing the detection value estimated as the cause detection value or an operation of decreasing the detection value estimated as the cause detection value is appropriate as an operation for mitigating the abnormality of the plant.

According to a fifth aspect of the present invention, in the plant monitoring device according to the first aspect, the second Mahalanobis distance calculation unit acquires the second Mahalanobis distance calculated by making the detection value estimated as the cause detection value greater than the detection values acquired by the detection value acquisition unit by a predetermined amount and the second Mahalanobis distance calculated by making the detection value estimated as the cause detection value smaller than the detection values acquired by the detection value acquisition unit by a predetermined amount. In a case where both of the second Mahalanobis distance calculated by making the detection value estimated as the cause detection value greater than the detection values acquired by the detection value acquisition unit by the predetermined amount and the second Mahalanobis distance calculated by making the detection value estimated as the cause detection value smaller than the detection values acquired by the detection value acquisition unit by the predetermined amount are greater than the first Mahalanobis distance, when a first increase amount, which is a difference between the second Mahalanobis distance calculated by making the detection value estimated as the cause detection value greater than the detection values acquired by the detection value acquisition unit by the predetermined amount and the first Mahalanobis distance, is greater than a second increase amount, which is a difference between the second Mahalanobis distance calculated by making the detection value estimated as the cause detection value smaller than the detection values acquired by the detection value acquisition unit by the predetermined amount and the first Mahalanobis distance, the identification unit identifies that the abnormality of the plant is able to be mitigated by making the detection value estimated as the cause detection value smaller than the detection values acquired by the detection value acquisition unit by a predetermined amount, and when the first increase amount is smaller than the second increase amount, the identification unit identifies that the abnormality of the plant is able to be mitigated by making the detection value estimated as the cause detection value greater than the detection values acquired by the detection value acquisition unit by a predetermined amount.

In this way, the plant monitoring device can accurately identify that either an operation of increasing the detection value estimated as the cause detection value or an operation of decreasing the detection value estimated as the cause detection value is appropriate as an operation for mitigating the abnormality of the plant.

According to a sixth aspect of the present invention, in the plant monitoring device according to any one of the second to fifth aspects, the second Mahalanobis distance calculation unit sets a value which is $1/10,000$ to $5/10$ of a standard deviation of a plurality of detection values associated with an evaluation item of the cause detection value, among the detection values included in the plurality of bundles of detection values configuring the unit space, as the predetermined amount.

In this way, the plant monitoring device can apply an appropriate increase or decrease amount according to the evaluation item of the cause detection value to the cause detection value.

According to a seventh aspect of the present invention, the plant monitoring device according to any one of the first to sixth aspects further includes a display unit that displays abnormality information including information for identifying an evaluation item of the detection value estimated as the cause detection value, and information in which whether the abnormality of the plant is able to be mitigated by making the detection value estimated as the cause detection value greater than the detection values acquired by the detection value acquisition unit or by making the detection value estimated as the cause detection value smaller than the detection values acquired by the detection value acquisition unit is identified.

In this way, the plant monitoring device can make an operator who monitors the plant not only recognize whether the detection value of the evaluation item is estimated to be abnormal but also recognize which operation can be performed to mitigate the abnormality of the plant. Accordingly, the operator can easily determine which operation is to be executed to eliminate the abnormality of the plant, with reference to the abnormality information.

According to an eighth aspect of the present invention, there is provided a plant monitoring method of monitoring an operation state of a plant which includes a plurality of evaluation items. The plant monitoring method includes a detection value acquiring step of acquiring a bundle of detection values, which is a collection of the detection values for each of the plurality of evaluation items, from the plant, a first Mahalanobis distance calculating step of calculating a first Mahalanobis distance of the bundle of detection values with a unit space configured by a plurality of the bundles of detection values as reference, a plant state determining step of determining whether the operation state of the plant is normal or abnormal according to whether or not the first Mahalanobis distance is within a threshold value determined in advance, a cause detection value estimating step of estimating a cause detection value, which is a detection value being a cause of an abnormality of the plant among the bundle of detection values, in a case where the operation state of the plant is determined to be abnormal, a second Mahalanobis distance calculating step of making the detection value estimated as the cause detection value among the bundle of detection values greater or smaller than the detection values acquired in the detection value acquiring step and calculating a second Mahalanobis distance of the bundle of the detection values, and an abnormality cause identifying step of identifying, based on the second Mahalanobis distance, whether the abnormality of the plant is able to be mitigated by making the detection value estimated as the cause detection value greater than the detection values acquired in the detection value acquiring step or whether the abnormality of the plant is able to be mitigated by making the detection value estimated as the cause detection value smaller than the detection values acquired in the detection value acquiring step.

According to a ninth aspect of the present invention, there is provided a program that causes a computer of a plant monitoring device monitoring an operation state of a plant which includes a plurality of evaluation items, to function. The program causes the computer to execute a detection value acquiring step of acquiring a bundle of detection values, which is a collection of the detection values for each of the plurality of evaluation items, from the plant, a first Mahalanobis distance calculating step of calculating a first Mahalanobis distance of the bundle of detection values with a unit space configured by a plurality of the bundles of detection values as reference, a plant state determining step of determining whether the operation state of the plant is normal or abnormal according to whether or not the first Mahalanobis distance is within a threshold value determined in advance, a cause detection value estimating step of estimating a cause detection value, which is a detection value estimated to be a cause of an abnormality of the plant among the bundle of detection values, in a case where the operation state of the plant is determined to be abnormal, a second Mahalanobis distance calculating step of making the detection value estimated as the cause detection value among the bundle of detection values greater or smaller than the detection values acquired in the detection value acquiring step and calculating a second Mahalanobis distance of the bundle of the detection values, and an abnormality cause identifying step of identifying, based on the second Mahalanobis distance, whether the abnormality of the plant is able to be mitigated by making the detection value estimated as the cause detection value greater than the detection values acquired in the detection value acquiring step or whether the abnormality of the plant is able to be mitigated by making the detection value estimated as the cause detection value smaller than the detection values acquired in the detection value acquiring step.

Advantageous Effects of Invention

With the plant monitoring device, the plant monitoring method, and the program according to the present invention, operation for mitigating an abnormality of the plant can be appropriately determined.

DESCRIPTION OF EMBODIMENTS

Hereinafter, a plant monitoring device 20 according to an embodiment of the present invention will be described with reference to FIGS. 1 to 6.

(Overall Configuration)

Figure 1:
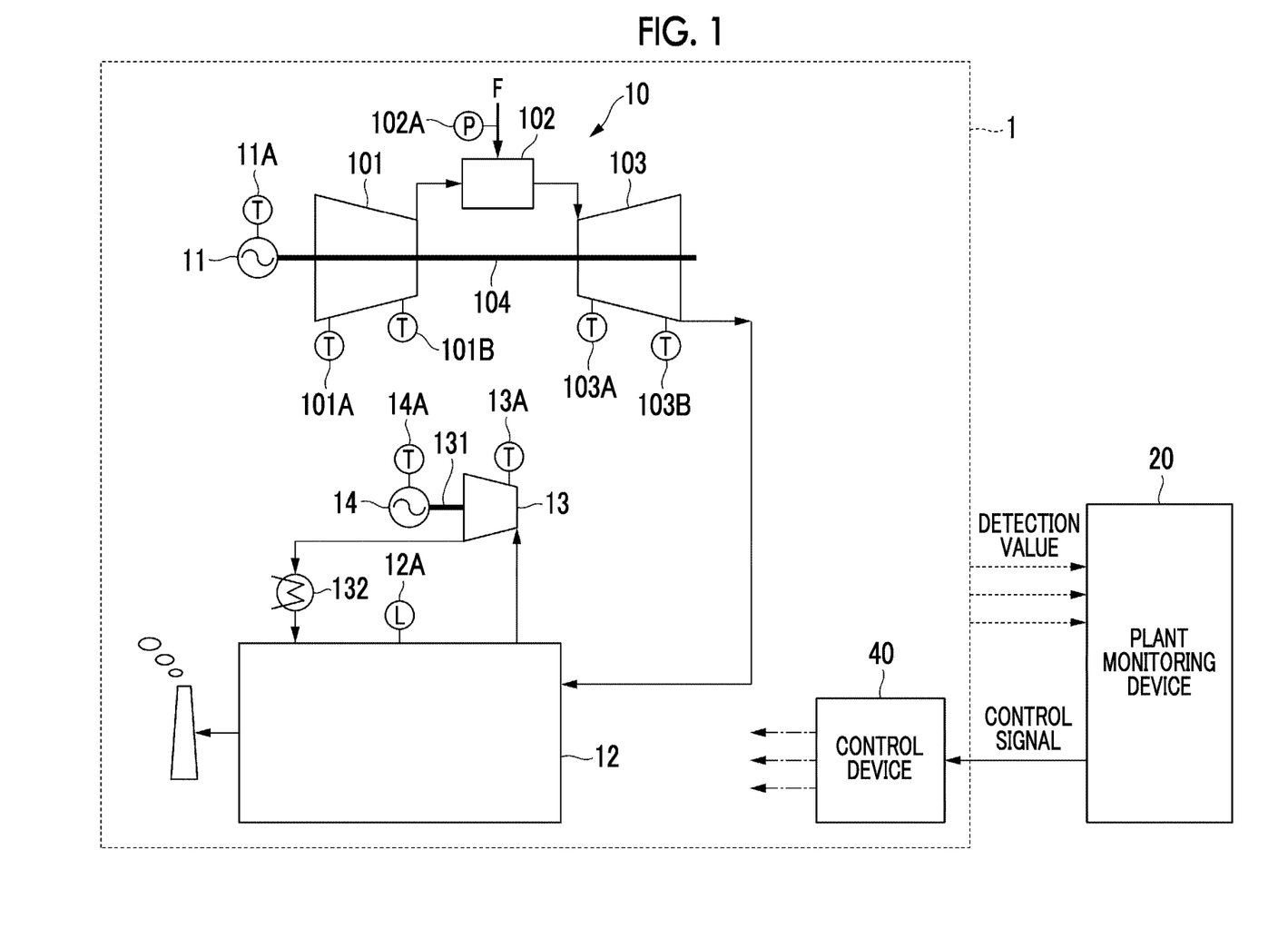
FIG. 1 is a diagram for describing an outline of a plant monitoring device according to an embodiment of the present invention.

As shown in FIG. 1, the plant monitoring device 20 according to the present embodiment is a device for monitoring an operation state of a plant 1 which includes a plurality of evaluation items. The plant monitoring device 20 acquires a detection value indicating a state quantity for each evaluation item from a detector provided in each part of the plant 1. The plant monitoring device 20 determines whether the operation state of the plant 1 is normal or abnormal based on the acquired detection value using the Mahalanobis Taguchi method (hereinafter, referred to as the MT method).

The plant 1 according to the present embodiment is a gas turbine combined power generation plant, and includes a gas turbine 10, a gas turbine generator 11, a heat recovery steam generator 12, a steam turbine 13, a steam turbine generator 14, and a control device 40. In another embodiment, the plant 1 may be a gas turbine power generation plant, an atomic power generation plant, or a chemical plant.

The gas turbine 10 includes a compressor 101, a combustor 102, and a turbine 103.

The compressor 101 compresses air taken in from a suction port. The compressor 101 is provided with thermometers 101A and 101B as detectors for detecting a temperature in an interior chamber of the compressor 101, which is one of the evaluation items. For example, the thermometer 101A may detect the temperature of an interior chamber inlet of the compressor 101 (inlet air temperature), and the thermometer 101B may detect the temperature of an interior chamber outlet (outlet air temperature).

The combustor 102 mixes a fuel F with compressed air introduced from the compressor 101 to combust the mixture, and generates a combustion gas. The combustor 102 is provided with a pressure sensor 102A as a detector for detecting the pressure of the fuel F, which is one of the evaluation items.

The turbine 103 is rotationally driven by the combustion gas supplied from the combustor 102. The turbine 103 is provided with thermometers 103A and 103B as detectors for detecting a temperature in the interior chamber, which is one of the evaluation items. For example, the thermometer 103A may detect the temperature of an interior chamber inlet of the turbine 103 (inlet combustion gas temperature), and the thermometer 103B may detect the temperature of an interior chamber outlet (outlet combustion gas temperature).

The gas turbine generator 11 is connected to a rotor 104 of the turbine 103 via the compressor 101, and generates power through the rotation of the rotor 104. The gas turbine generator 11 is provided with a thermometer 11A as a detector for detecting the temperature of a lubricant, which is one of the evaluation items.

The heat recovery steam generator 12 heats water with a combustion gas (exhaust gas) exhausted from the turbine 103, and generates steam. The heat recovery steam generator is provided with a level meter 12A as a detector for detecting a water level of a drum, which is one of the evaluation items.

The steam turbine 13 is driven by the steam from the heat recovery steam generator 12. The steam turbine 13 is provided with a thermometer 13A as a detector for detecting a temperature in the interior chamber, which is one of the evaluation items. In addition, the steam exhausted from the steam turbine 13 is converted back to water by a condenser 132, and is sent to the heat recovery steam generator 12 via a water supply pump.

The steam turbine generator 14 is connected to a rotor 131 of the steam turbine 13, and generates power through the rotation of the rotor 131. The steam turbine generator is provided with a thermometer 14A as a detector for detecting the temperature of a lubricant, which is one of the evaluation items.

The evaluation items described above are examples, and are not limited thereto. For example, an output of the gas turbine generator 11, a pressure in the interior chamber of the turbine 103, and the rotation speed and vibration of the rotor 104 may be set as other evaluation items of the plant 1. In this case, although not shown, a detector that detects each of the state quantities of the evaluation items is provided in each part of the plant 1.

The control device 40 is a device for controlling an operation of the plant 1. In addition, in a case where the plant monitoring device 20 determines that the operation state of the plant 1 is abnormal, the control device 40 may control an operation of each part of the plant 1 in accordance with a control signal from the plant monitoring device 20.

(Functional Configuration of Plant Monitoring Device)

Figure 2:
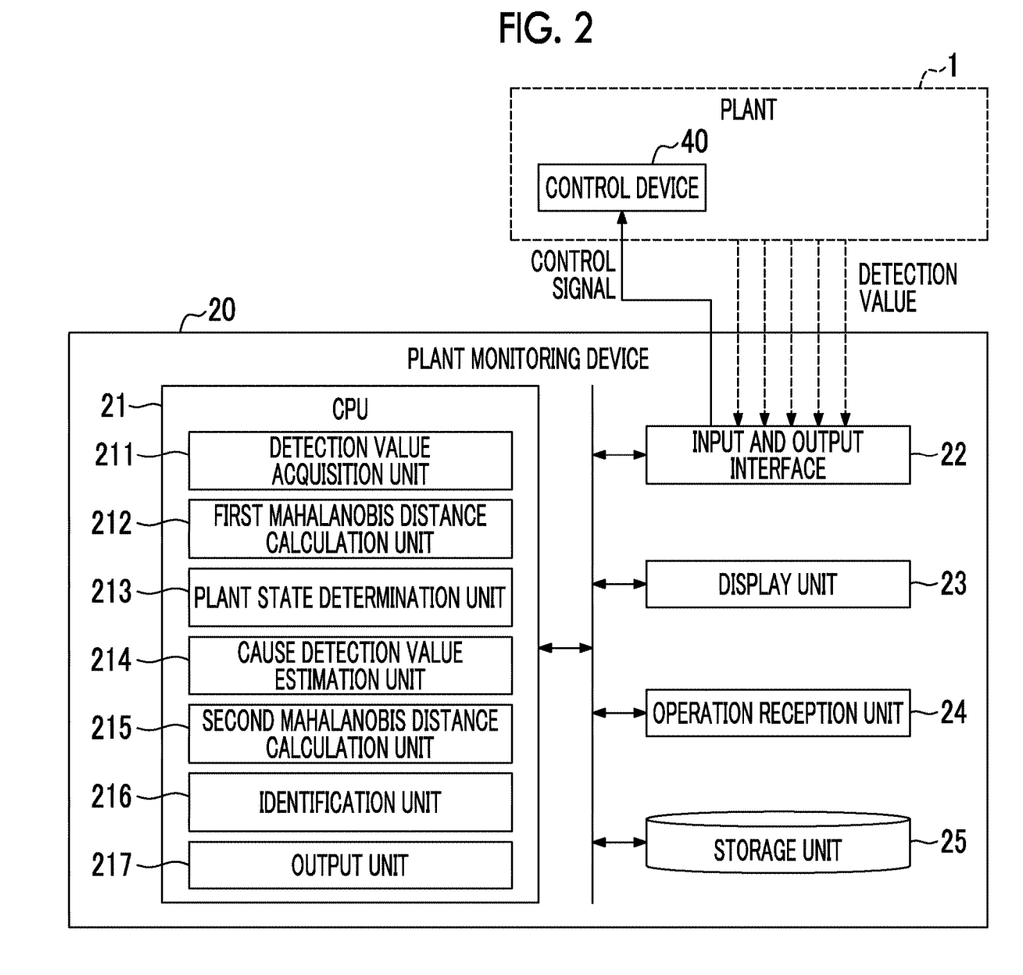
FIG. 2 is a diagram showing a functional configuration of the plant monitoring device according to the embodiment of the present invention.

FIG. 2 is a diagram showing a functional configuration of the plant monitoring device according to the embodiment of the present invention.

As shown in FIG. 2, the plant monitoring device 20 includes a CPU 21, an input and output interface 22, a display unit 23, an operation reception unit 24, and a storage unit 25.

The input and output interface 22 is connected to the detector of each part of the plant 1, and receives an input of a detection value for each of the plurality of evaluation items.

The display unit 23 is a display for displaying determination results of the operation state of the plant 1 from the plant monitoring device 20. For example, the display unit 23 displays abnormality information including information for identifying an evaluation item estimated to be a cause of an abnormality of the plant 1, and information in which whether the abnormality of the plant 1 can be mitigated by increasing a detection value of the evaluation item or whether the abnormality of the plant 1 can be mitigated by decreasing the detection value of the evaluation item is identified. Examples of the information for identifying an evaluation item include an evaluation item, the name of a detector, and an identification number.

The operation reception unit 24 is a device such as a keyboard and a mouse for receiving operations from an operator who monitors the plant 1.

The CPU 21 is a processor that controls an operation of the entire plant monitoring device 20. The CPU 21 functions as a detection value acquisition unit 211, a first Mahalanobis distance calculation unit 212, a plant state determination unit 213, a cause detection value estimation unit 214, a second Mahalanobis distance calculation unit 215, an identification unit 216, and an output unit 217 by executing various types of arithmetic processing in accordance with a program prepared in advance.

The detection value acquisition unit 211 acquires a bundle of detection values, which is a collection of detection values for each of the plurality of evaluation items, from the plant 1 via the input and output interface 22. The detection value acquisition unit 211 acquires a bundle of detection values every predetermined time (for example, one minute), and stores and accumulates the bundle in the storage unit 25.

The first Mahalanobis distance calculation unit 212 calculates a Mahalanobis distance (first Mahalanobis distance) of a bundle of detection values with a unit space configured by a plurality of bundles of detection values, which are past operation data, as reference.

The plant state determination unit 213 determines whether the operation state of the plant 1 is normal or abnormal according to whether or not a first Mahalanobis distance is within a threshold value determined in advance.

In a case where the operation state of the plant 1 is determined to be abnormal, the cause detection value estimation unit 214 estimates a cause detection value, which is a detection value being a cause of an abnormality of the plant 1 among a bundle of detection values.

The second Mahalanobis distance calculation unit 215 makes a detection value estimated as a cause detection value among a bundle of detection values greater or smaller than the detection values acquired by the detection value acquisition unit 211, and calculates a Mahalanobis distance (second Mahalanobis distance) of a bundle of the detection values.

In a case where the plant state determination unit 213 determines that the operation state of the plant 1 is abnormal, the identification unit 216 identifies operation of mitigating the abnormality. In the present embodiment, the identification unit 216 identifies, based on the second Mahalanobis distance, whether the abnormality of the plant 1 can be mitigated by making the detection value estimated as the cause detection value greater than the detection values acquired by the detection value acquisition unit 211 or whether the abnormality of the plant 1 can be mitigated by making the detection value estimated as the cause detection value smaller than the detection values acquired by the detection value acquisition unit 211.

In a case where the plant state determination unit 213 determines that the operation state of the plant 1 is abnormal, the output unit 217 causes the display unit 23 to display abnormality information including information for identifying an evaluation item of a detection value estimated as a cause detection value, and information in which whether the abnormality of the plant 1 can be mitigated by making the detection value estimated as the cause detection value greater than the detection values acquired by the detection value acquisition unit 211 or whether the abnormality of the plant 1 can be mitigated by making the detection value estimated as the cause detection value smaller than the detection values acquired by the detection value acquisition unit 211 is identified. In addition, in a case where the operator performs operation for remotely controlling the plant 1 via the operation reception unit 24, the output unit 217 may output a control signal corresponding to the operation to the control device 40 of the plant 1.

The storage unit 25 stores data acquired and generated in the processing of each part of the CPU 21.

(Processing Flow of Plant Monitoring Device)

Figure 3:
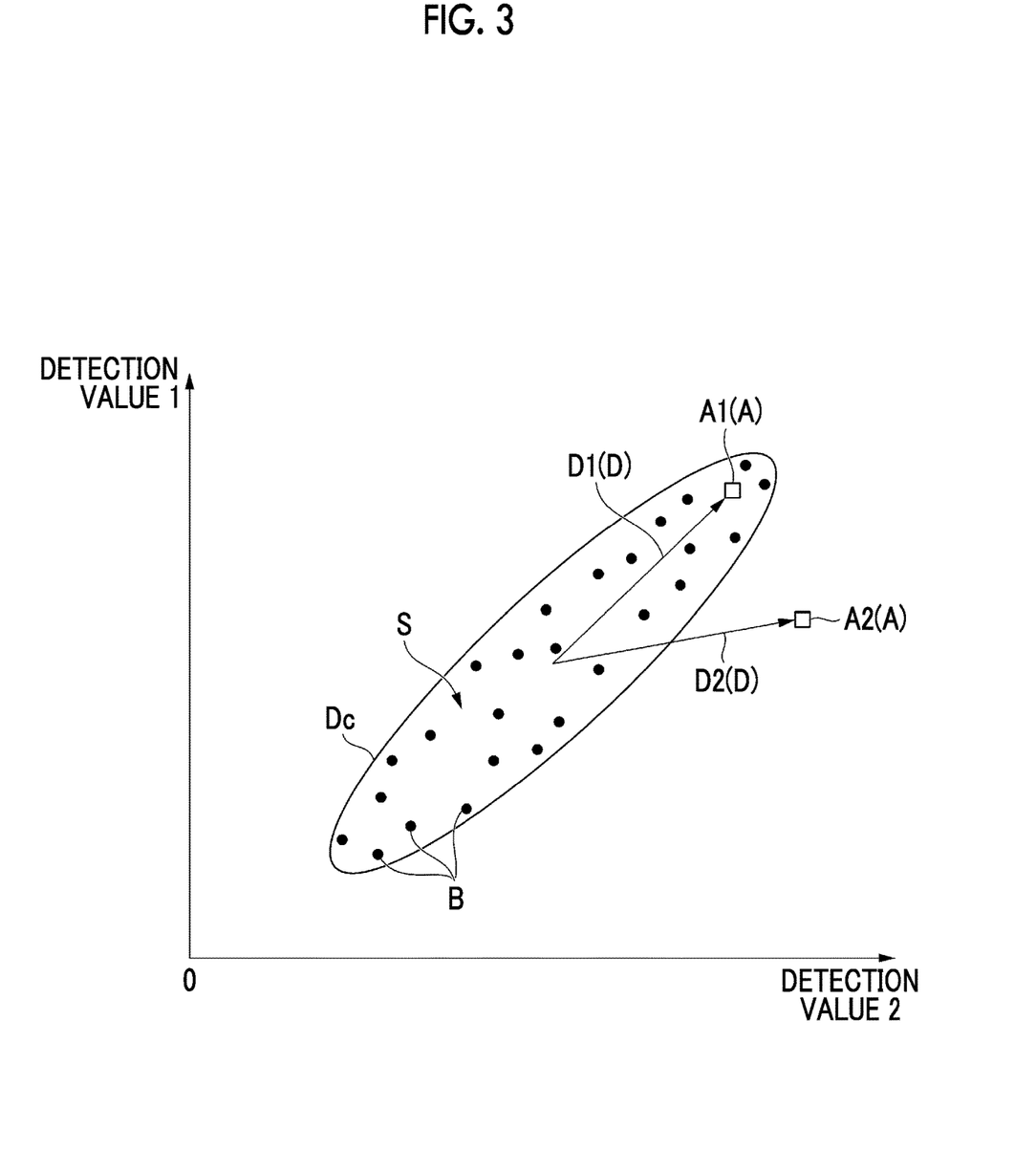
FIG. 3 is a conceptual diagram showing the concept of a Mahalanobis distance.

FIG. 3 is a conceptual diagram showing the concept of a Mahalanobis distance.

Figure 4:
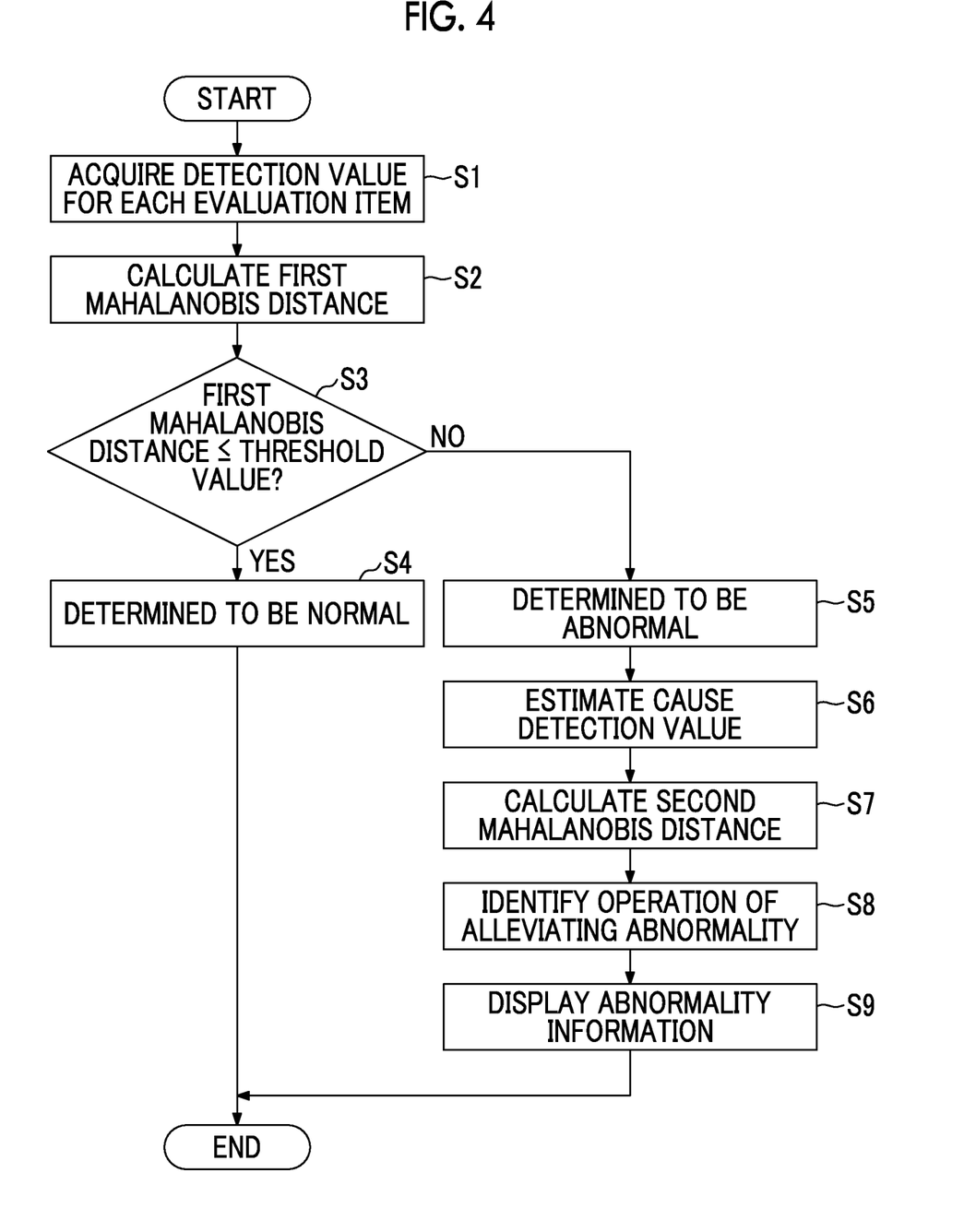
FIG. 4 is a flowchart showing an example of processing of the plant monitoring device according to the embodiment of the present invention.

FIG. 4 is a flowchart showing an example of processing of the plant monitoring device according to the embodiment of the present invention.

Hereinafter, an example of the processing of the plant monitoring device 20 according to the present embodiment will be described with reference to FIGS. 3 and 4.

The plant monitoring device 20 according to the present embodiment determines whether the operation state of the plant 1 is normal or abnormal using the MT method as described above. First, the outline of a plant monitoring method using the MT method will be described with reference to FIG. 3.

As shown in FIG. 3, it is assumed that the detection value acquisition unit 211 of the plant monitoring device 20 acquires a detection value 1 and a detection value 2 of the plant 1 as a bundle B of detection values. For example, the detection value 1 is a "gas turbine output", and the detection value 2 is a "boiler water level". In the MT method, a data group, which is an aggregate of the plurality of bundles B of detection values, is set as a unit space S, which is a reference data group, and calculates a Mahalanobis distance D of a bundle A of detection values acquired at a certain time point.

The Mahalanobis distance D is a distance that is weighted according to a variance and a correlation of detection values for the unit space S, and has a greater value as similarity with the data group for the unit space S becomes lower. Herein, the average of the Mahalanobis distances of the bundles B of detection values configuring the unit space S is 1, and in a case where the operation state of the plant 1 is normal, the Mahalanobis distance D of the bundle A of detection values is generally 4 or less. However, when the operation state of the plant 1 is abnormal, the value of the Mahalanobis distance D increases according to the degree of the abnormality.

For this reason, in the MT method, whether the operation state of the plant 1 is normal or abnormal is determined according to whether or not the Mahalanobis distance is within a threshold value Dc determined in advance. For example, since a Mahalanobis distance D1 of a bundle A1 of detection values is equal to or smaller than the threshold value Dc, it is determined that the operation state of the plant 1 is normal at a time point when the bundle A1 of detection values is acquired. In addition, since a Mahalanobis distance D2 of a bundle A2 of detection values is greater than the threshold value Dc, it is determined that the operation state of the plant 1 is abnormal at a time point when the bundle A2 of detection values is acquired.

The threshold value Dc is preferably set to a value greater than the maximum Mahalanobis distance, for example, among respective Mahalanobis distances of the plurality of bundles B of detection values configuring the unit space S. In addition, at this time, it is preferable to determine the threshold value Dc in consideration of characteristics unique to the plant 1. The threshold value Dc may be changed by the operator via the operation reception unit 24 of the plant monitoring device 20.

Next, monitoring of the operation state of the plant 1 by the plant monitoring device 20 will be described with reference to FIG. 4. Herein, in the storage unit 25 of the plant monitoring device 20, a plurality of bundles of detection values acquired in the past from the plant 1 are accumulated, and a unit space created based on the plurality of bundles of detection values and a threshold value of a Mahalanobis distance are stored.

As shown in FIG. 4, the detection value acquisition unit 211 acquires a detection value for each of a plurality of evaluation items from a detector provided in each part of the plant 1 (Step S1). For example, in a case where the number of evaluation items is 100, the detection value acquisition unit 211 acquires 100 detection values corresponding to the respective evaluation items, and stores the evaluation items in the storage unit 25 as one bundle (a bundle of detection values).

Next, the first Mahalanobis distance calculation unit 212 calculates a first Mahalanobis distance of each detection value acquired in Step S1 with the unit space stored in the storage unit 25 as reference (Step S2).

Next, the plant state determination unit 213 determines whether or not the first Mahalanobis distance calculated in Step S2 is equal to or smaller than a threshold value stored in advance in the storage unit 25 (Step S3).

In a case where the first Mahalanobis distance is equal to or smaller than the threshold value (Step S3: YES), the plant state determination unit 213 determines that the operation state of the plant 1 is normal (Step S4), and terminates the processing. At this time, the output unit 217 may cause the display unit 23 to display the determination result showing that the operation state of the plant 1 is normal.

On the contrary, in a case where the first Mahalanobis distance exceeds the threshold value (Step S3: NO), the plant state determination unit 213 determines that the operation state of the plant 1 is abnormal (Step S5), and proceeds to the next processing.

While it is possible to determine the presence or absence of an abnormality of the operation state of the plant 1 from the first Mahalanobis distance, a location where the abnormality has occurred cannot be estimated from the first Mahalanobis distance. For this reason, in a case where the operation state of the plant 1 is determined to be abnormal, the cause detection value estimation unit 214 estimates a cause detection value, which is a detection value determined to be a cause of the abnormality of the plant 1 among the bundle of detection values acquired in Step S1 (Step S6).

For example, the cause detection value estimation unit 214 estimates the detection value, which is the abnormality, from a difference in the desired signal-to-noise (S/N) ratio of the presence or absence of an item based on the orthogonal array analysis. The difference in the desired S/N ratio of the presence or absence of the item based on the orthogonal array analysis has a property of increasing with the detection value of the evaluation item, which is the abnormality. Based on such a property, the cause detection value estimation unit 214 estimates that the detection value of the evaluation item having the greatest difference in the desired S/N ratio is a cause contributing to the increase in the Mahalanobis distance, that is, the cause detection value.

Next, the second Mahalanobis distance calculation unit 215 makes the detection value estimated as the cause detection value among the bundle of detection values greater or smaller than the detection values acquired in Step S1, and calculates a second Mahalanobis distance of the bundle of the detection values (Step S7).

Specifically, the second Mahalanobis distance calculation unit 215 increases the detection value estimated as the cause detection value (hereinafter, also simply referred to as "the cause detection value") by a predetermined amount, and calculates the second Mahalanobis distance. The predetermined amount may be set in advance for each evaluation item based on the plurality of bundles of detection values configuring the unit space. For example, in a case where the evaluation item of the cause detection value is "the water level of the drum of the heat recovery steam generator 12", the second Mahalanobis distance calculation unit 215 calculates the standard deviation of a plurality of detection values associated with "the water level of the drum of the heat recovery steam generator 12" among detection values included in the plurality of bundles of detection values configuring the unit space. Then, the second Mahalanobis distance calculation unit 215 sets a value (+0.0001σ to +0.5σ) which is $\frac{1}{10,000}$ to $\frac{5}{10}$ of the standard deviation as a predetermined amount. The predetermined amount is more preferably a value (+0.001σ to +0.1σ) which is $\frac{1}{1,000}$ to $\frac{1}{10}$ of the standard deviation, and is most preferably a value (+0.01σ to +0.1σ) which is $\frac{1}{100}$ to $\frac{1}{10}$ of the standard deviation.

Next, the identification unit 216 identifies operation for mitigating the abnormality of the plant 1 (Step S8).

For example, even in a case where the detection value of "the water level of the drum of the heat recovery steam generator 12", which is the cause detection value, is higher than an average value, there is a case where simply performing operation of lowering the water level of the drum to the average value does not always eliminate the abnormality, and the abnormality is eliminated by performing operation of raising the water level of the drum in view of a relationship between the cause detection value and another detection value. As described above, since there is a possibility that an operation method for eliminating the abnormality differs according to the relationship between the cause detection value and another detection value, in some cases, the operator cannot easily determine whether the operation of lowering the cause detection value is necessary or whether the operation of raising the cause detection value is necessary only by considering the cause detection value.

Therefore, whether to perform operation of increasing the cause detection value or to perform operation of decreasing the cause detection value in order to mitigate the abnormality of the plant 1 is to be determined in view of the relationship with a plurality of other detection values. For this reason, the identification unit 216 according to the present embodiment identifies operation for mitigating the abnormality of the plant 1 based on the first Mahalanobis distance and the second Mahalanobis distance.

Specifically, in a case where the second Mahalanobis distance is greater than the first Mahalanobis distance, the identification unit 216 identifies that the cause detection value tends to be high in view of a relationship with another detection value, and the abnormality of the plant 1 cannot be mitigated by increasing the cause detection value. That is, in a case where Expression (1) below is satisfied, the identification unit 216 identifies that operation of increasing the cause detection value is not to be performed. MD is the Mahalanobis distance of the bundle of detection values acquired in Step S1, and x indicates the cause detection value included in the bundle of the detection values.

$$\partial(MD)/\partial x > 0 \quad (1)$$

In addition, in a case where the second Mahalanobis distance is smaller than the first Mahalanobis distance, the identification unit 216 identifies that the cause detection value tends to be low in view of a relationship with another detection value, and the abnormality of the plant 1 can be mitigated by increasing the cause detection value. That is, in a case where Expression (2) below is satisfied, the identification unit 216 identifies that operation of increasing the cause detection value is to be performed.

$$\partial(MD)/\partial x < 0 \quad (2)$$

The identification unit 216 may further estimate a failure location of the plant 1 and the cause of the abnormality (for example, shaft bending and malfunction of a fuel valve) from a pattern of the bundle of detection values acquired in Step S1.

Next, the output unit 217 causes the display unit 23 to display abnormality information T1 (FIG. 5) (Step S9).

Figure 5:
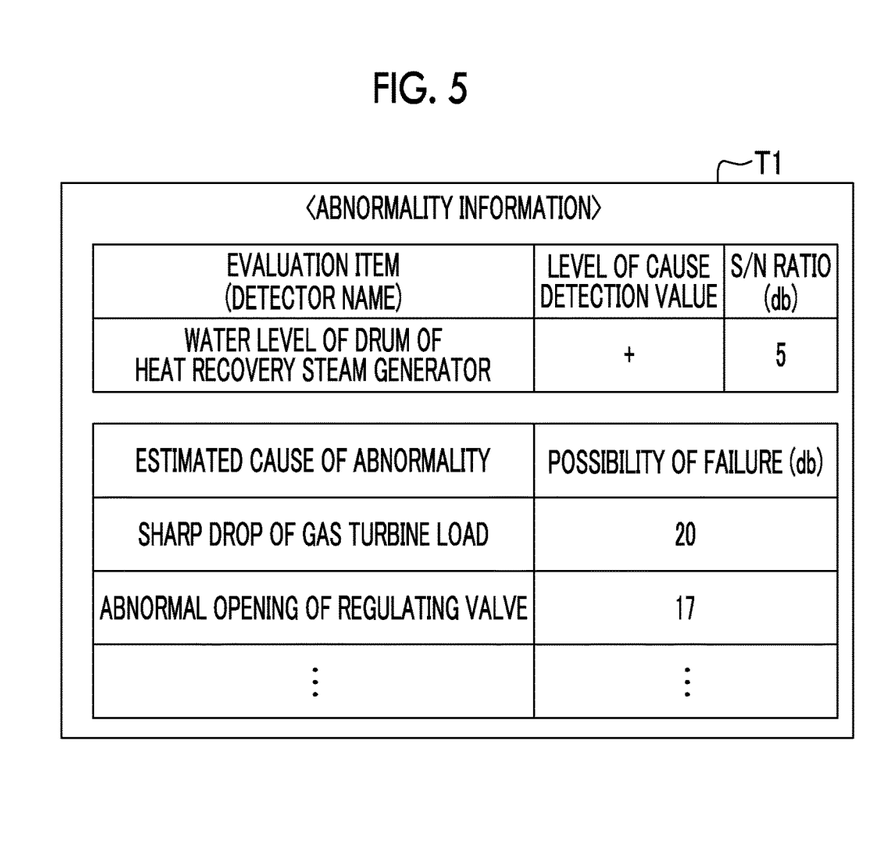
FIG. 5 is a table showing an example of abnormality information according to the embodiment of the present invention.

FIG. 5 is a table showing an example of the abnormality information according to the embodiment of the present invention.

As shown in FIG. 5, the abnormality information T1 includes, for example, information for identifying an evaluation item of a detection value estimated as a cause detection value, information indicating the level of a cause detection value, and a difference in the S/N ratio of a detection value estimated as a cause detection value. The information for identifying an evaluation item is, for example, the name of a detector which has detected a cause detection value. For example, in a case where the identification unit 216 has identified that "a detection value estimated as a cause detection value tends to be high in view of a relationship with another detection value", the level of the cause detection value is expressed as "+", and in a case where the identification unit 216 has identified that "the detection value estimated as the cause detection value tends to be low in view of a relationship with another detection value", the level of the cause detection value is expressed as "−". In addition, in a case where the identification unit 216 has identified the failure location of the plant 1 and the cause of the abnormality, the abnormality information T1 may include information indicating "an estimated cause of an abnormality" and "a possibility of failure".

The plant monitoring device 20 executes the processing of FIG. 4 for each predetermined time (for example, one minute), and monitors the operation state of the plant 1.

An aspect in which there is only one cause detection value estimated by the cause detection value estimation unit 214 is described in the example described above, but the invention is not limited thereto. There may be a plurality of cause detection values estimated by the cause detection value estimation unit 214. For example, the cause detection value estimation unit 214 may estimate that detection values of the top five evaluation items, among evaluation items having a great desired S/N ratio, as cause detection values in Step S6.

In this case, the second Mahalanobis distance calculation unit 215 calculates a second Mahalanobis distance for each of the plurality of cause detection values in Step S7.

In addition, in Step S8, the identification unit 216 identifies, for each of the plurality of cause detection values, whether or not the abnormality of the plant 1 can be mitigated by making the detection value estimated as the cause detection value greater than the detection values acquired by the detection value acquisition unit 211. That is, in Step S7, in a case where there are two cause detection values, the second Mahalanobis distance calculation unit 215 calculates two second Mahalanobis distances including a second Mahalanobis distance in which a detection value estimated as a first cause detection value is changed and a second Mahalanobis distance in which a detection value estimated as a second cause detection value is changed. In addition, in Step S8, the identification unit 216 identifies whether to increase or decrease the detection value estimated as the first cause detection value and whether to increase or decrease the detection value estimated as the second cause detection value, respectively.

Further, the output unit 217 causes the display unit 23 to display the abnormality information T1 including the name of the detector which has detected each of the detection values estimated as the plurality of cause detection values, information in which whether or not the detection values estimated as the cause detection values are to be increased is identified, and a difference in the S/N ratio.

(Hardware Configuration of Plant Monitoring Device)

Figure 6:
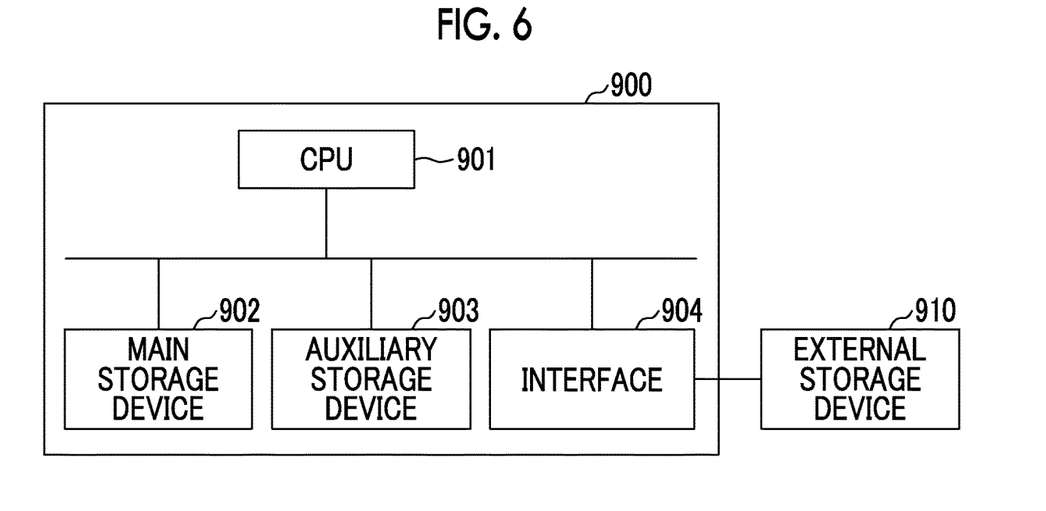
FIG. 6 is a diagram showing an example of a hardware configuration of the plant monitoring device according to the embodiment of the present invention.

FIG. 6 is a diagram showing an example of a hardware configuration of the plant monitoring device according to the embodiment of the present invention.

Hereinafter, the hardware configuration of the plant monitoring device 20 according to the embodiment will be described with reference to FIG. 6.

A computer 900 includes a CPU 901, a main storage device 902, an auxiliary storage device 903, and an interface 904.

The plant monitoring device 20 described above is mounted on the computer 900. Then, an operation of each part of the plant monitoring device 20 described above is stored in a form of a program in the auxiliary storage device 903 included in each computer 900. The CPU 901 (CPU 21) reads the program from the auxiliary storage device 903, deploys the program in the main storage device 902, and executes the processing in accordance with the program. In addition, the CPU 901 secures, in the main storage device 902, a storage area (storage unit 25) for storing various types of information which is acquired and generated with the processing in accordance with the program. In addition, the CPU 901 secures the storage area for storing data, which is being processed, in the auxiliary storage device 903 in accordance with the program.

The computer 900 is connected to an external storage device 910 via the interface 904, and the storage area may be secured in the external storage device 910.

In at least one embodiment, the auxiliary storage device 903 is an example of a non-transitory tangible medium. Other examples of the non-transitory tangible medium include a magnetic disk, a magneto-optical disk, a CD-ROM, a DVD-ROM, and a semiconductor memory which are connected via the interface 904. In addition, in a case where the program is distributed to the computer 900 via a communication line, the computer 900 that has received the distribution may deploy the program in the main storage device 902 and execute the processing.

In addition, the program may be a program for realizing some of the functions described above. Further, the program may be a program that realizes the functions described above in combination with other programs already stored in the auxiliary storage device 903, that is, a so-called difference file (difference program).

(Operational Effects)

As described above, the plant monitoring device 20 according to the present embodiment is the plant monitoring device 20 monitoring the operation state of the plant 1 which includes a plurality of evaluation items, and including the detection value acquisition unit 211 that acquires a bundle of detection values, which is a collection of detection values for each of the plurality of evaluation items, from the plant 1, the first Mahalanobis distance calculation unit 212 that calculates a first Mahalanobis distance of the bundle of detection values, with a unit space configured by a plurality of bundles of detection values as reference, the plant state determination unit 213 that determines whether the operation state of the plant 1 is normal or abnormal according to whether or not the first Mahalanobis distance is within a threshold value determined in advance, the cause detection value estimation unit 214 that estimates a cause detection value, which is a detection value being a cause of the abnormality of the plant 1 among the bundle of detection values, in a case where the operation state of the plant 1 is determined to be abnormal, the second Mahalanobis distance calculation unit 215 that makes the detection value estimated as the cause detection value among the bundle of detection values greater than the detection values acquired by the detection value acquisition unit 211 and calculates a second Mahalanobis distance of the bundle of the detection values, and the identification unit 216 that identifies, based on the second Mahalanobis distance, whether or not the abnormality of the plant can be mitigated by making the detection value estimated as the cause detection value greater than the detection values acquired by the detection value acquisition unit.

As described above, for example, even in a case where the cause detection value is higher than an average value, there is a case where simply performing operation of lowering the cause detection value to the average value does not always eliminate the abnormality, and the abnormality is eliminated by performing operation of raising the cause detection value in view of a relationship between the cause detection value and another detection value. For this reason, it is difficult to determine whether or not operation of increasing the cause detection value is to be performed only by considering the cause detection value. However, as the plant monitoring device 20 according to the present embodiment has the configuration described above, whether or not the abnormality of the plant 1 can be mitigated can be identified by performing, for the abnormality of the plant 1, operation of increasing the detection value estimated as the cause detection value in view of the relationship between the cause detection value and another detection value. Accordingly, the plant monitoring device 20 can appropriately determine operation for mitigating the abnormality of the plant 1.

In addition, the second Mahalanobis distance calculation unit 215 makes the detection value estimated as the cause detection value greater than the detection values acquired by the detection value acquisition unit 211 by a predetermined amount, and calculates a second Mahalanobis distance. In a case where the second Mahalanobis distance is greater than the first Mahalanobis distance, the identification unit 216 identifies that the abnormality of the plant 1 can be mitigated by making the detection value estimated as the cause detection value greater than the detection values acquired by the detection value acquisition unit 211 by the predetermined amount. In a case where the second Mahalanobis distance is smaller than the first Mahalanobis distance, the identification unit 216 identifies that the abnormality of the plant 1 can be mitigated by making the detection value estimated as the cause detection value greater than the detection values acquired by the detection value acquisition unit 211 by the predetermined amount.

In this way, based on whether or not the Mahalanobis distance has increased by making the detection value estimated as the cause detection value greater than the acquired values, the plant monitoring device 20 can accurately identify that operation of increasing the detection value estimated as the cause detection value is not to be performed. In a case where the Mahalanobis distance has decreased, operation of increasing the detection value estimated as the cause detection value is to be performed.

In addition, the second Mahalanobis distance calculation unit 215 sets a value, which is $1/10,000$ to $5/10$ of the standard deviation of a plurality of detection values associated with an evaluation item of the cause detection value, among detection values included in the plurality of bundles of detection values configuring the unit space, as the predetermined amount. The second Mahalanobis distance calculation unit 215 more preferably sets the predetermined amount to a value which is $1/1,000$ to $1/10$ of the standard deviation, and most preferably sets the predetermined amount to a value which is $1/100$ to $1/10$ of the standard deviation.

In this way, the plant monitoring device 20 can apply an appropriate increase or decrease amount according to the evaluation item of the cause detection value to the cause detection value. Accordingly, the plant monitoring device 20 can better improve the accuracy of identifying a cause of the abnormality of the plant 1.

In addition, the plant monitoring device 20 further includes the display unit 23 that displays abnormality information including information for identifying an evaluation item of a detection value estimated as a cause detection value and information in which whether or not the abnormality of the plant 1 can be mitigated by making the detection value estimated as the cause detection value greater than the detection values acquired by the detection value acquisition unit 211 is identified.

In this way, the plant monitoring device 20 can make the operator who monitors the plant 1 not only recognize whether the detection value of the evaluation item is estimated to be abnormal but also recognize which operation can be performed to mitigate the abnormality of the plant. Accordingly, the operator can easily determine which operation is to be executed to eliminate the abnormality of the plant 1, with reference to the abnormality information.

Although the embodiment of the present invention has been described in detail hereinbefore, the present invention is not limited thereto and can undergo some design changes without departing from the technical spirit of the present invention.

<Modification Example 1>

For example, although an aspect in which the second Mahalanobis distance calculation unit 215 calculates a second Mahalanobis distance by increasing a cause detection value by a predetermined amount has been described in the embodiment described above, the invention is not limited thereto. For example, in Modification Example 1, the second Mahalanobis distance calculation unit 215 may calculate a second Mahalanobis distance by decreasing a cause detection value by a predetermined amount in Step S7 of FIG. 4. As in the embodiment described above, the predetermined amount in the present modification example is set to a value which is $1/10,000$ to $5/10$ of the standard deviation of a plurality of detection values associated with the same evaluation item as the cause detection value. In addition, the predetermined amount is more preferably set to a value which is $1/1,000$ to $1/10$ of the standard deviation, and is most preferably set to a value which is $1/100$ to $1/10$ of the standard deviation.

In this case, in Step S8 of FIG. 4, in a case where the second Mahalanobis distance is greater than the first Mahalanobis distance, the identification unit 216 identifies that the cause detection value tends to be low in view of a relationship with another detection value, and the abnormality of the plant 1 cannot be mitigated by decreasing the cause detection value. On the contrary, in a case where the second Mahalanobis distance is smaller than the first Mahalanobis distance, the identification unit 216 identifies that the cause detection value tends to be high in view of a relationship with another detection value, and the abnormality of the plant 1 can be mitigated by decreasing the cause detection value.

Even with such a configuration, the plant monitoring device 20 can accurately identify whether or not the abnormality of the plant 1 can be mitigated by performing operation of decreasing the cause detection value, as in the embodiment described above.

<Modification Example 2>

In addition, in Modification Example 2, in Step S7 of FIG. 4, the second Mahalanobis distance calculation unit 215 may acquire two second Mahalanobis distances including a second Mahalanobis distance A calculated by increasing a cause detection value by a predetermined amount and a second Mahalanobis distance B calculated by decreasing the cause detection value by a predetermined amount. The predetermined amount in the present modification example may be the same as in the embodiment and Modification Example 1 described above, or may be set to any different value.

In this case, in Step S8 of FIG. 4, in a case where the second Mahalanobis distance A calculated by increasing the cause detection value is greater than the second Mahalanobis distance B calculated by decreasing the cause detection value, the identification unit 216 identifies that the cause detection value tends to be high in view of a relationship with another detection value, and the abnormality of the plant 1 can be mitigated by decreasing the cause detection value. On the contrary, in a case where the second Mahalanobis distance A calculated by increasing the cause detection value is smaller than the second Mahalanobis distance B calculated by decreasing the cause detection value, the identification unit 216 identifies that the cause detection value tends to be low in view of a relationship with another detection value, and the abnormality of the plant 1 can be mitigated by increasing the cause detection value.

Even with such a configuration, the plant monitoring device 20 can accurately identify how the cause detection value is to be used so that the abnormality of the plant 1 can be mitigated, as in the embodiment described above.

<Modification Example 3>

In addition, in Modification Example 3, as in Modification Example 2, in Step S7 of FIG. 4, the second Mahalanobis distance calculation unit 215 may acquire two second Mahalanobis distances including the second Mahalanobis distance A calculated by increasing a cause detection value by a predetermined amount and the second Mahalanobis distance B calculated by decreasing the cause detection value by a predetermined amount. The predetermined amount in the present modification example may be set to any value as in Modification Example 2 described above.

In this case, in Step S8 of FIG. 4, the identification unit 216 executes the following processing in a case where both of the second Mahalanobis distance A calculated by increasing the cause detection value by the predetermined amount and the second Mahalanobis distance B calculated by decreasing the cause detection value by the predetermined amount are greater than a first Mahalanobis distance.

In a case where a first increase amount, which is a difference between the second Mahalanobis distance A calculated by increasing the cause detection value by the predetermined amount and the first Mahalanobis distance, is greater than a second increase amount, which is a difference between the second Mahalanobis distance B calculated by decreasing the cause detection value by the predetermined amount and the first Mahalanobis distance, the identification unit 216 identifies that the cause detection value tends to be high in view of a relationship with another detection values, and the abnormality of the plant 1 can be mitigated by decreasing the cause detection value. On the contrary, in a case where the first increase amount is smaller than the second increase amount, the identification unit 216 identifies that the cause detection value tends to be low in view of a relationship with another detection value, and the abnormality of the plant 1 can be mitigated by increasing the cause detection value.

In Modification Example 3, the predetermined amount for increasing or decreasing the cause detection value is set to a value which is 5/10 or more of the standard deviation of a plurality of detection values associated with the same evaluation item as the cause detection value. For this reason, the predetermined amount in the present modification example is set to a value greater than the predetermined amounts in the embodiment, Modification Example 1, and Modification Example 2 described above. For this reason, it is considered that there is almost zero probability that both of the second Mahalanobis distances A and B are smaller than the first Mahalanobis distance. Based on such consideration, since the processing described above is performed only in a case where both of the second Mahalanobis distances A and B are greater than the first Mahalanobis distance, the identification unit 216 according to Modification Example 3 can prevent the processing from being complicated.

Even with such a configuration, the plant monitoring device 20 can accurately identify whether operation of increasing the cause detection value or operation of decreasing the cause detection value can mitigate the abnormality of the plant 1, as in the embodiment described above.

INDUSTRIAL APPLICABILITY

With the plant monitoring device, the plant monitoring method, and the program described above, operation for mitigating an abnormality of the plant can be appropriately determined.

REFERENCE SIGNS LIST 1 plant
10 gas turbine
11 gas turbine generator
12 heat recovery steam generator
13 steam turbine
14 steam turbine generator
20 plant monitoring device
21 CPU
22 input and output interface
23 display unit
24 operation reception unit
25 storage unit
40 control device
211 detection value acquisition unit
212 first Mahalanobis distance calculation unit
213 plant state determination unit
214 cause detection value estimation unit
215 second Mahalanobis distance calculation unit
216 identification unit
217 output unit

The invention claimed is:

1. A plant monitoring device that monitors an operation state of a plant which includes a plurality of evaluation items, the plant monitoring device comprising:
a detection value acquisition unit that acquires a bundle of detection values, which is a collection of the detection values for each of the plurality of evaluation items, from the plant;
a first Mahalanobis distance calculation unit that calculates a first Mahalanobis distance of the bundle of detection values with a unit space configured by a plurality of the bundles of detection values as reference;
a plant state determination unit that determines whether the operation state of the plant is normal or abnormal according to whether or not the first Mahalanobis distance is within a threshold value determined in advance;
a cause detection value estimation unit that estimates a cause detection value, which is a detection value estimated to be a cause of an abnormality of the plant among the bundle of detection values, in a case where the operation state of the plant is determined to be abnormal;
a second Mahalanobis distance calculation unit that makes the detection value estimated as the cause detection value among the bundle of detection values greater or smaller than the detection values acquired by the detection value acquisition unit and calculates a second Mahalanobis distance of the bundle of the detection values; and
an identification unit that identifies, based on the second Mahalanobis distance, whether the abnormality of the plant is able to be mitigated by making the detection value estimated as the cause detection value greater than the detection values acquired by the detection value acquisition unit or whether the abnormality of the plant is able to be mitigated by making the detection value estimated as the cause detection value smaller than the detection values acquired by the detection value acquisition unit.

2. The plant monitoring device according to claim 1, wherein the second Mahalanobis distance calculation unit makes the detection value estimated as the cause detection value greater than the detection values acquired by the detection value acquisition unit by a predetermined amount and calculates the second Mahalanobis distance,
the identification unit identifies that the abnormality of the plant is unable to be mitigated by making the detection value estimated as the cause detection value greater than the detection values acquired by the detection value acquisition unit by a predetermined amount in a case where the second Mahalanobis distance is greater than the first Mahalanobis distance, and the identification unit identifies that the abnormality of the plant is able to be mitigated by making the detection value estimated as the cause detection value greater than the detection values acquired by the detection value acquisition unit by a predetermined amount in a case where the second Mahalanobis distance is smaller than the first Mahalanobis distance.

3. The plant monitoring device according to claim 1, wherein the second Mahalanobis distance calculation unit makes the detection value estimated as the cause detection value smaller than the detection values acquired by the detection value acquisition unit by a predetermined amount and calculates the second Mahalanobis distance, the identification unit identifies that the abnormality of the plant is unable to be mitigated by making the detection value estimated as the cause detection value smaller than the detection values acquired by the detection value acquisition unit by a predetermined amount in a case where the second Mahalanobis distance is greater than the first Mahalanobis distance, and the identification unit identifies that the abnormality of the plant is able to be mitigated by making the detection value estimated as the cause detection value smaller than the detection values acquired by the detection value acquisition unit by a predetermined amount in a case where the second Mahalanobis distance is smaller than the first Mahalanobis distance.

4. The plant monitoring device according to claim 1, wherein the second Mahalanobis distance calculation unit acquires the second Mahalanobis distance calculated by making the detection value estimated as the cause detection value greater than the detection values acquired by the detection value acquisition unit by a predetermined amount and the second Mahalanobis distance calculated by making the detection value estimated as the cause detection value smaller than the detection values acquired by the detection value acquisition unit by a predetermined amount, the identification unit identifies that the abnormality of the plant is able to be mitigated by making the detection value estimated as the cause detection value smaller than the detection values acquired by the detection value acquisition unit by a predetermined amount in a case where the second Mahalanobis distance calculated by making the detection value estimated as the cause detection value greater than the detection values acquired by the detection value acquisition unit by the predetermined amount is greater than the second Mahalanobis distance calculated by making the detection value estimated as the cause detection value smaller than the detection values acquired by the detection value acquisition unit by the predetermined amount, and the identification unit identifies that the abnormality of the plant is able to be mitigated by making the detection value estimated as the cause detection value greater than the detection values acquired by the detection value acquisition unit by a predetermined amount in a case where the second Mahalanobis distance calculated by making the detection value estimated as the cause detection value greater than the detection values acquired by the detection value acquisition unit by the predetermined amount is smaller than the second Mahalanobis distance calculated by making the detection value estimated as the cause detection value smaller than the detection values acquired by the detection value acquisition unit by the predetermined amount.

5. The plant monitoring device according to claim 1, wherein the second Mahalanobis distance calculation unit acquires the second Mahalanobis distance calculated by making the detection value estimated as the cause detection value greater than the detection values acquired by the detection value acquisition unit by a predetermined amount and the second Mahalanobis distance calculated by making the detection value estimated as the cause detection value smaller than the detection values acquired by the detection value acquisition unit by a predetermined amount, and in a case where both of the second Mahalanobis distance calculated by making the detection value estimated as the cause detection value greater than the detection values acquired by the detection value acquisition unit by the predetermined amount and the second Mahalanobis distance calculated by making the detection value estimated as the cause detection value smaller than the detection values acquired by the detection value acquisition unit by the predetermined amount are greater than the first Mahalanobis distance, when a first increase amount, which is a difference between the second Mahalanobis distance calculated by making the detection value estimated as the cause detection value greater than the detection values acquired by the detection value acquisition unit by the predetermined amount and the first Mahalanobis distance, is greater than a second increase amount, which is a difference between the second Mahalanobis distance calculated by making the detection value estimated as the cause detection value smaller than the detection values acquired by the detection value acquisition unit by the predetermined amount and the first Mahalanobis distance, the identification unit identifies that the abnormality of the plant is able to be mitigated by making the detection value estimated as the cause detection value smaller than the detection values acquired by the detection value acquisition unit by a predetermined amount, and when the first increase amount is smaller than the second increase amount, the identification unit identifies that the abnormality of the plant is able to be mitigated by making the detection value estimated as the cause detection value greater than the detection values acquired by the detection value acquisition unit by a predetermined amount.

6. The plant monitoring device according to claim 2, wherein the second Mahalanobis distance calculation unit sets a value which is $1/10{,}000$ to $5/10$ of a standard deviation of a plurality of detection values associated with an evaluation item of the cause detection value, among the detection values included in the plurality of bundles of detection values configuring the unit space, as the predetermined amount.

7. The plant monitoring device according to claim 1, further comprising:

a display unit that displays abnormality information including information for identifying an evaluation item of the detection value estimated as the cause detection value, and information in which whether the abnormality of the plant is able to be mitigated by making the detection value estimated as the cause detection value greater than the detection values acquired by the detection value acquisition unit or by making the detection value estimated as the cause detection value smaller than the detection values acquired by the detection value acquisition unit is identified.

8. A plant monitoring method of monitoring an operation state of a plant which includes a plurality of evaluation items, the plant monitoring method comprising:
- a detection value acquiring step of acquiring a bundle of detection values, which is a collection of the detection values for each of the plurality of evaluation items, from the plant;
- a first Mahalanobis distance calculating step of calculating a first Mahalanobis distance of the bundle of detection values with a unit space configured by a plurality of the bundles of detection values as reference;
- a plant state determining step of determining whether the operation state of the plant is normal or abnormal according to whether or not the first Mahalanobis distance is within a threshold value determined in advance;
- a cause detection value estimating step of estimating a cause detection value, which is a detection value being a cause of an abnormality of the plant among the bundle of detection values, in a case where the operation state of the plant is determined to be abnormal;
- a second Mahalanobis distance calculating step of making the detection value estimated as the cause detection value among the bundle of detection values greater or smaller than the detection values acquired in the detection value acquiring step and calculating a second Mahalanobis distance of the bundle of the detection values; and
- an abnormality cause identifying step of identifying, based on the second Mahalanobis distance, whether the abnormality of the plant is able to be mitigated by making the detection value estimated as the cause detection value greater than the detection values acquired in the detection value acquiring step or whether the abnormality of the plant is able to be mitigated by making the detection value estimated as the cause detection value smaller than the detection values acquired in the detection value acquiring step.

9. A program that causes a computer of a plant monitoring device monitoring an operation state of a plant which includes a plurality of evaluation items to function, the program causing the computer to execute:
- a detection value acquiring step of acquiring a bundle of detection values, which is a collection of the detection values for each of the plurality of evaluation items, from the plant;
- a first Mahalanobis distance calculating step of calculating a first Mahalanobis distance of the bundle of detection values with a unit space configured by a plurality of the bundles of detection values as reference;
- a plant state determining step of determining whether the operation state of the plant is normal or abnormal according to whether or not the first Mahalanobis distance is within a threshold value determined in advance;
- a cause detection value estimating step of estimating a cause detection value, which is a detection value estimated to be a cause of an abnormality of the plant among the bundle of detection values, in a case where the operation state of the plant is determined to be abnormal;
- a second Mahalanobis distance calculating step of making the detection value estimated as the cause detection value among the bundle of detection values greater or smaller than the detection values acquired in the detection value acquiring step and calculating a second Mahalanobis distance of the bundle of the detection values; and
- an abnormality cause identifying step of identifying, based on the second Mahalanobis distance, whether the abnormality of the plant is able to be mitigated by making the detection value estimated as the cause detection value greater than the detection values acquired in the detection value acquiring step or whether the abnormality of the plant is able to be mitigated by making the detection value estimated as the cause detection value smaller than the detection values acquired in the detection value acquiring step.

* * * * *